(12) United States Patent
Masumoto

(10) Patent No.: US 10,189,936 B2
(45) Date of Patent: Jan. 29, 2019

(54) BLOCK COPOLYMER, DISPERSANT, AND PIGMENT DISPERSION COMPOSITION

(71) Applicant: OTSUKA CHEMICAL CO., LTD., Osaka, Osaka (JP)

(72) Inventor: Satoru Masumoto, Tokushima (JP)

(73) Assignee: OTSUKA CHEMICAL CO., LTD., Osaka (JP)

(*) Notice: Subject to any disclaimer, the term of this patent is extended or adjusted under 35 U.S.C. 154(b) by 0 days.

(21) Appl. No.: 15/546,071

(22) PCT Filed: Jan. 29, 2016

(86) PCT No.: PCT/JP2016/052675
§ 371 (c)(1),
(2) Date: Jul. 25, 2017

(87) PCT Pub. No.: WO2016/132863
PCT Pub. Date: Aug. 25, 2016

(65) Prior Publication Data
US 2018/0002473 A1    Jan. 4, 2018

(30) Foreign Application Priority Data

Feb. 17, 2015 (JP) ................. 2015-028137

(51) Int. Cl.
*C09D 17/00* (2006.01)
*C09D 153/00* (2006.01)
*C08F 293/00* (2006.01)

(52) U.S. Cl.
CPC .......... *C08F 293/005* (2013.01); *C09D 17/00* (2013.01); *C09D 153/00* (2013.01); *C08F 2438/00* (2013.01)

(58) Field of Classification Search
CPC .... C08F 293/005; C09D 17/00; C09D 11/326
USPC ........................................................ 524/561
See application file for complete search history.

(56) References Cited

U.S. PATENT DOCUMENTS

| 5,085,698 | A | 2/1992 | Ma et al. |
| 5,221,334 | A | 6/1993 | Ma et al. |
| 5,272,201 | A | 12/1993 | Ma et al. |
| 5,713,993 | A * | 2/1998 | Grezzo Page ......... C09D 11/40 106/31.85 |
| 2010/0143590 | A1 | 6/2010 | Held et al. |
| 2011/0223529 | A1 | 9/2011 | Shimanaka et al. |
| 2013/0196064 | A1 | 8/2013 | Shimanaka et al. |

FOREIGN PATENT DOCUMENTS

| EP | 3095829 A1 | 11/2016 |
| EP | 3150677 A1 | 4/2017 |
| JP | 5-179183 A | 7/1993 |
| JP | 2004-315596 | 11/2004 |
| JP | 2010-209244 A | 9/2010 |
| JP | 2011-508797 A | 3/2011 |
| JP | 2013-203746 A | 10/2013 |
| JP | 2013-216714 A | 10/2013 |
| JP | 2014-15541 A | 1/2014 |
| JP | 2014-208762 A | 11/2014 |
| WO | 2010/013651 A1 | 2/2010 |

OTHER PUBLICATIONS

Notification of Transmittal of Translation of the International Preliminary Report on Patentability and Written Opinion of the International Searching Authority dated Aug. 31, 2017, issued in PCT/JP2016/052675.
International Search Report dated Apr. 26, 2016, issued in counterpart International Application No. PCT/JP2016/052675 (2 pages).
Office Action dated Aug. 7, 2018, issued in Japanese Patent Application No. 2017-500580.
European Search Report with opinion dated Jul. 31, 2018 issued in European Patent Application No. 16752252.3.
Office Action dated Jul. 30, 2018, issued in Taiwanese Patent Application No. TW10720692570.

* cited by examiner

*Primary Examiner* — William K Cheung
(74) *Attorney, Agent, or Firm* — Westerman, Hattori, Daniels & Adrian, LLP

(57) ABSTRACT

Provided is a block copolymer with an acid group that, when used as a dispersant, can provide a dispersion composition having excellent dispersion stability, a dispersant containing the block copolymer, and a pigment dispersion composition using the dispersant. The block copolymer is an ABA block copolymer including an A block and a B block and has the feature that its acid value is 30 to 250 mgKOH/g and the B block contains a structural unit derived from a vinyl monomer with an acid group.

7 Claims, No Drawings

BLOCK COPOLYMER, DISPERSANT, AND PIGMENT DISPERSION COMPOSITION

This application is a national stage of PCT International Application No. PCT/JP2016/052675, filed on Jan. 29, 2016, which claims priority to and incorporates by reference the entire contents of Japanese Patent Application No. 2015-028137 filed in Japan on Feb. 17, 2015.

TECHNICAL FIELD

The present invention relates to block copolymers, dispersants, and pigment dispersion compositions.

BACKGROUND ART

Regarding pigment dispersion compositions, such as paints, printing inks, and makeups, the required levels and types of their functions and performances have increased and the technical challenge for stably dispersing a substance to be dispersed has become greater. For example, a pigment can more sufficiently exhibit performances and characteristics inherently possessed by its particles themselves with increasing degree of fineness, but the achievement of its sufficient dispersibility often cannot be made in combination with a vehicle alone and further requires a dispersant. Dispersion compositions famed of fine particles generally exhibit high viscosity, which not only makes it difficult to take out their products from dispersers and transport them but also, at significantly high viscosity, may cause gelation during storage and thus make it difficult to use the products.

The dispersant has a structure including a part adsorbable to a pigment and a part having a high affinity for a dispersion medium and the performance of the dispersant is determined by the balance between these two functional parts. Various types of parts adsorbable to a pigment can be used according to the surface condition of the substance to be dispersed; an acidic part (acidic dispersant) is used for a pigment having a surface biased toward the basic side, while a basic part (basic dispersant) is used for a pigment having a surface biased toward the acidic side.

Meanwhile, in producing a color filter for use in a liquid crystal display or the like, a coating film made of a dispersion composition in which a pigment, a dispersant, and a dispersion medium are mixed is formed on a substrate and exposed to light through a photomask of a desired pattern shape and unexposed portions thereof are removed with an alkaline aqueous solution (alkaline development). In this case, to remove the unexposed portions with an alkaline aqueous solution, a developing polymer with an acid group is added to the dispersion composition. During the alkaline development, the unexposed portions are removed by neutralizing the acid groups of the developing polymer with the alkaline aqueous solution to turn the developing polymer water-soluble. Therefore, basic dispersants, which are less soluble in alkaline aqueous solutions, cause deterioration in developability.

Patent Literature 1 proposes to use as a pigment dispersant an AB block copolymer composed of an A polymer block and a B polymer block and containing 90% by mass or more structural unit derived from a methacrylate monomer, wherein at least the B polymer block of the polymer blocks forming the copolymer contains at least one of two types of acid groups present in a carboxyl group-containing methacrylate monomer having a carboxyl group and a phosphoric acid group-containing methacrylate monomer having a phosphoric acid group.

CITATION LIST

Patent Literature

Patent Literature 1: JP-A-2014-15541

SUMMARY OF INVENTION

Technical Problem

The acidic dispersant in Patent Literature 1 has insufficient dispersibility, which needs to increase its amount of use. However, if the amount of use is increased, the solubility of other additives may be adversely affected. Therefore, there has heretofore been a need for an acidic dispersant having excellent dispersibility.

The present invention has an object of providing a block copolymer with an acid group that, for example, when used as a dispersant, can provide a dispersion composition having excellent dispersion stability, a dispersant containing the block copolymer, and a pigment dispersion composition using the dispersant.

Solution to Problem

The present invention provides the following block copolymer, dispersant, and pigment dispersion composition.

Aspect 1: A block copolymer of an ABA type including an A block and a B block and having an acid value of 30 to 250 mgKOH/g, the B block containing a structural unit derived from a vinyl monomer with an acid group.

Aspect 2: The block copolymer according to Aspect 1, wherein a structural unit derived from a vinyl monomer with an acid group and contained in the A block is at a content of 10% by mass or less in 100% by mass of the A block.

Aspect 3: The block copolymer according to Aspect 1 or 2, wherein the structural unit derived from a vinyl monomer with an acid group and contained in the B block is at a content of 40% by mass or more in 100% by mass of the B block.

Aspect 4: The block copolymer according to any one of Aspects 1 to 3, wherein the acid group is at least one selected from among a carboxyl group, a sulfonic acid group, and a phosphoric acid group.

Aspect 5: The block copolymer according to any one of Aspects 1 to 4, wherein a content of the B block is 5 to 95% by mass in 100% by mass of the entire block copolymer.

Aspect 6: The block copolymer according to any one of Aspects 1 to 5, being famed by living radical polymerization.

Aspect 7: A dispersant containing the block copolymer according to any one of Aspects 1 to 6.

Aspect 8: A pigment dispersion composition containing the dispersant according to Aspect 7, a pigment, and a dispersion medium.

Advantageous Effects of Invention

The block copolymer according to the present invention, for example, when used as a dispersant, can provide a dispersion composition having excellent dispersion stability.

The dispersant according to the present invention can provide a dispersion composition having excellent dispersion stability.

The pigment dispersion composition according to the present invention has excellent pigment dispersion stability.

DESCRIPTION OF EMBODIMENTS

Hereinafter, a description will be given of an example of a preferred embodiment for working of the present invention. However, the following embodiment is simply illustrative. The present invention is not at all intended to be limited to the following embodiment.

<Block Copolymer>

A block copolymer according to the present invention is a copolymer famed by polymerization using two or more types of vinyl monomers. Specifically, the block copolymer is an ABA block copolymer including an A block and a B block and has the feature that its acid value is 30 to 250 mgKOH/g and the B block contains a structural unit derived from a vinyl monomer with an acid group. The A block and B block can also be paraphrased as an "A segment" and a "B segment", respectively.

The block copolymer preferably contains 90% by mass or more structural unit derived from a (meth)acrylic vinyl monomer. The two A blocks of the block copolymer may have the same structure or different structures.

In the present invention, the vinyl monomer refers to a monomer whose molecule has a radically polymerizable carbon-carbon double bond. Furthermore, in the present invention, the structural unit derived from a vinyl monomer refers to a structural unit in which the radically polymerizable carbon-carbon double bond in the vinyl monomer has been turned into a carbon-carbon single bond. Moreover, "(meth)acrylic" refers to "at least one of acrylic and methacrylic", "(meth)acrylic acid" refers to "at least one of acrylic acid and methacrylic acid", "(meth)acrylate" refers to "at least one of acrylate and methacrylate", and "(meth)acryloyl" refers to "at least one of acryloyl and methacryloyl".

It can be assumed that, in the block copolymer according to the present invention, the A block is compatible with a dispersion medium, such as a solvent, and the acid groups of the B block adsorb to the surface of the pigment by hydrogen bonding, ionic bonding or the like. By localizing the acid groups in the middle of the polymer, the block copolymer according to the present invention acts as a dispersant more excellent than a polymer or block copolymer with acid groups at one or both ends.

It is preferred that the acid value of the block copolymer be 30 to 250 mgKOH/g and the B block contain a structural unit derived from a vinyl monomer with an acid group so that the acid value of the block copolymer falls within the above range. If the acid value is smaller than 30 mgKOH/g, the adsorbability to the pigment may deteriorate. If the acid value is larger than 250 mgKOH/g, the pigment may agglomerate. The lower limit of the acid value is preferably 50 mgKOH/g and more preferably 70 mgKOH/g. The upper limit of the acid value is preferably 200 mgKOH/g and more preferably 150 mgKOH/g.

The weight-average molecular weight (Mw) of the block copolymer is preferably 5,000 to 50,000. The lower limit of Mw is preferably 8,000 and more preferably 10,000. The upper limit of Mw is preferably 40,000 and more preferably 30,000.

The molecular weight distribution (PDI) of the block copolymer is preferably less than 2, more preferably less than 1.5, and still more preferably less than 1.3. In the present invention, the PDI is obtained by (weight-average molecular weight (Mw) of block copolymer)/(number average molecular weight (Mn) of block copolymer). As the PDI is smaller, a copolymer having a narrower molecular weight distribution width and therefore closer molecular weights can be obtained. When the PDI value is 1.0, the molecular weight distribution width is narrowest. On the contrary, as the PDI is larger, the copolymer includes portions having smaller molecular weights or larger molecular weights than the designed polymer molecular weight, which deteriorates the pigment dispersibility. The reason for this is that polymer portions having an excessively small molecular weight are excessively high in solubility in the dispersion medium and polymer portions having an excessively large molecular weight are poor in solubility in the dispersion medium.

The content of the B block is preferably 5 to 95% by mass and more preferably 10 to 40% by mass in 100% by mass of the entire block copolymer. Furthermore, the content ratio between the two A blocks in the block copolymer is preferably adjusted within a range of (50:50) to (70:30) by mass. By adjusting the contents of the A block and B block within the above ranges, the acid groups can be localized to have the desired function.

The vinyl monomers for use in the present invention are classified into a vinyl monomer with an acid group and a vinyl monomer free of acid group and examples of such acid groups include a carboxyl group, a sulfonic acid group, and a phosphoric acid group.

The following examples can be cited as the vinyl monomers for use in the present invention.

Examples of vinyl monomers with an acid group include: monomers formed by reacting (meth)acrylic acid, crotonic acid, maleic acid, fumaric acid, itaconic acid or hydroxyalkyl (meth)acrylate, such as 2-hydroxyethyl (meth)acrylate or 4-hydoxybutyl (meth)acrylate, with an acid anhydride, such as maleic anhydride, succinic anhydride or phthalic anhydride; vinyl monomers with a carboxyl group, such as vinylbenzoic acid; vinyl monomers with a sulfonic acid group, such as styrenesulfonic acid, dimethylpropylsulfonic acid (meth)acrylamide, ethylsulfonate (meth)acrylate, ethylsulfonate (meth)acrylamide or vinylsulfonic acid; and vinyl monomers with a phosphoric acid group, such as methacryloyloxyethylphosphoric acid esters.

Examples of vinyl monomers free of acid group include: alkyl esters of (meth)acrylic acid, such as methyl (meth)acrylate, ethyl (meth)acrylate, n-propyl (meth)acrylate, isopropyl (meth)acrylate, n-butyl (meth)acrylate, isobutyl (meth)acrylate, s-butyl (meth)acrylate, t-butyl (meth)acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, and n-stearyl (meth)acrylate; alicyclic alkyl esters of (meth)acrylic acid, such as cyclohexyl (meth)acrylate, methylcyclohexyl (meth)acrylate, cyclododecyl (meth)acrylate, bornyl (meth)acrylate, isobornyl (meth)acrylate, dicyclopentanyl (meth)acrylate, dicyclopentenyl (meth)acrylate, and dicyclopentenyloxyethyl (meth)acrylate; aryl esters of (meth)acrylic acid, such as benzyl (meth)acrylate, phenyl (meth)acrylate, and phenoxyethyl (meth)acrylate; hydroxyl group-containing (meth)acrylates, such as 2-hydroxyethyl (meth)acrylate, 3-hydroxypropyl (meth)acrylate, 2-hydroxypropyl (meth)acrylate, and 4-hydroxybutyl (meth)acrylate; (meth)acrylates with a polyethylene glycol structural unit, such as diethylene glycol mono(meth)acrylate, triethylene glycol mono(meth)acrylate, tetraethylene glycol mono(meth)acrylate, polyethylene glycol mono(meth)acrylate, methoxydiethylene glycol (meth)acrylate, methoxytriethylene glycol (meth)acrylate, methoxytetraethylene glycol (meth)acrylate, and methoxypolyethylene glycol (meth) acrylate; and aromatic vinyl monomers, such as styrene, α-methylstyrene, 4-methylstyrene, 2-methylstyrene, 3-methylstyrene, 4-methoxystyrene, 2-hydroxymethylstyrene, and 1-vinylnaphthalene.

(A Block)

The A block is a polymer block containing a structural unit derived from a vinyl monomer free of acid group. In the case where the A block contains two or more types of structural units, the structural units may be contained in any copolymeric form, such as random copolymerization or block copolymerization, in the A block, but are preferably contained in the form of random copolymerization from the viewpoint of homogeneity. For example, the A block may be formed of a copolymer of a structural unit consisting of an a1 block and a structural unit consisting of an a2 block.

Any vinyl monomer free of acid group can be used without particular limitation insofar as it is a monomer polymerizable with another or other vinyl monomers forming the copolymer, and such vinyl monomers may be used alone or in combination of two or more thereof. Such a vinyl monomer can be used, for example, by appropriate selection from among the vinyl monomers for use in the present invention specifically described previously. Preferred among them is at least one selected from alkyl esters of (meth)acrylic acid, alicyclic alkyl esters of (meth)acrylic acid, and aryl esters of (meth)acrylic acid and particularly preferred among them are alkyl esters of (meth)acrylic acid in which the alkyl group has 1 to 10 carbon atoms.

In the A block, the structural unit derived from a vinyl monomer with an acid group is preferably at a content of 10% by mass or less, more preferably 5% by mass or less, and still more preferably 2% by mass or less in 100% by mass of the A block. In the present invention, the A block is particularly preferably a polymer block substantially free of structural unit derived from a vinyl monomer with an acid group. The term "substantially free of" herein means that the content thereof is 0.1% by mass or less.

(B Block)

The B block is a polymer block containing a structural unit derived from a vinyl monomer with an acid group, examples of such acid groups contained in the B block include a carboxyl group, a sulfonic acid group, and a phosphoric acid group, and the carboxyl group is preferred. In the case where the B block contains two or more types of structural units, the structural units may be contained in any copolymeric form, such as random copolymerization or block copolymerization, in the B block, but are preferably contained in the form of random copolymerization from the viewpoint of homogeneity. For example, the B block may be famed of a copolymer of a structural unit consisting of a b1 block and a structural unit consisting of a b2 block.

Any vinyl monomer with an acid group can be used without particular limitation insofar as it is a monomer polymerizable with another or other vinyl monomers forming the copolymer, and such vinyl monomers may be used alone or in combination of two or more thereof. Such a vinyl monomer can be used, for example, by appropriate selection from among the vinyl monomers for use in the present invention specifically described previously. Preferred among them are vinyl monomers with a carboxyl group.

In the B block, the structural unit derived from a vinyl monomer with an acid group is preferably at a content of 40% by mass or more and more preferably 70% by mass or more in 100% by mass of the B block. The B block is particularly preferably a polymer block consisting substantially only of the structural unit derived from a vinyl monomer with an acid group. The team "consisting substantially only of" herein means that the content thereof is 99.9% by mass or more.

The B block may consist substantially only of the structural unit derived from a vinyl monomer with an acid group or may contain a structural unit derived from a vinyl monomer free of acid group insofar as the B block is more acid than the A block. In the case where the B block contains a structural unit derived from a vinyl monomer free of acid group, the structural unit is preferably at a content of 60% by mass or less and more preferably 30% by mass or less in 100% by mass of the B block.

Any vinyl monomer free of acid group can be used without particular limitation insofar as it is a monomer polymerizable with another or other vinyl monomers forming the copolymer, and such vinyl monomers may be used alone or in combination of two or more thereof. Such a vinyl monomer can be used, for example, by appropriate selection from among the vinyl monomers for use in the present invention specifically described previously. Preferred among them is at least one selected from alkyl esters of (meth)acrylic acid, alicyclic alkyl esters of (meth)acrylic acid, and aryl esters of (meth)acrylic acid and particularly preferred among them are alkyl esters of (meth)acrylic acid in which the alkyl group has 1 to 10 carbon atoms.

(Method for Producing Block Copolymer)

As a method for producing a block copolymer according to the present invention, an ABA triblock may be produced by producing an A block by a polymerization reaction of a vinyl monomer, polymerizing a monomer for a B block with the A block to produce an AB diblock, and then polymerizing a monomer for an A block with the AB diblock, or an ABA triblock may be produced by producing two AB diblocks and then coupling the B blocks contained in the AB diblocks together. For example, the above block copolymer can be obtained by using a living radical polymerization process to allow respective vinyl monomers forming the blocks to undergo a polymerization reaction one after another. A specific example that can be cited is a polymerization method including using a living radical polymerization process to perform the steps of: polymerizing a vinyl monomer forming one of two A blocks to form a polymer of the one A block; after forming the polymer of the one A block, polymerizing a vinyl monomer forming a B block to form a polymer of the B block; and, after forming the polymer of the B block, polymerizing a vinyl monomer forming the other of the two A block to form a polymer of the other A block.

A conventional radical polymerization process may cause deactivations of growing ends owing not only to the initiation reaction and the propagation reaction but also to the termination reaction and the chain-transfer reaction, which may form a polymer mixture having various molecular weights and a heterogeneous composition. Unlike this, the living radical polymerization process is, while keeping the convenience and versatility of the conventional radical polymerization process, less likely to cause the termination reaction and the chain-transfer, so that growing ends propagate without deactivating. Therefore, the living radical polymerization process has the advantage that it can facilitate accurate control of the molecular weight distribution and production of a polymer having a homogeneous composition. The above living radical polymerization process is, according to the approach for stabilizing polymerization growing ends, classified into the process using a transition metal catalyst (ATRP process), the process using a sulfur-based, reversible chain-transfer agent (RAFT process), the process using an organotellurium compound (TERP process), and so on. The ATRP process does not protect acid groups of an acid group-containing vinyl monomer because of the use of an amine complex and, therefore, cannot be used. In the case of using many types of monomers, the RAFT process is less likely to provide a low molecular weight distribution and has problems of sulfurous smell, coloration, and so on. Among these processes, the TERP process is preferably used from the viewpoints of the variety of usable monomers, molecular weight control in a high molecular weight region, homogeneous composition, and coloration.

The TERP process is a process for polymerizing a radical polymerizable compound using an organotellurium compound as a polymerization initiator and, for example, a process described in WO2004/14848 and WO2004/14962.

Specifically, polymerization is performed using any one of:

(a) an organotellurium compound represented by the general formula (1);

(b) a mixture of an organotellurium compound represented by the general formula (1) and an azo polymerization initiator;

(c) a mixture of an organotellurium compound represented by the general formula (1) and an organoditellurium compound represented by the general formula (2); and (d) a mixture of an organotellurium compound represented by the general formula (1), an azo polymerization initiator, and an organoditellurium compound represented by the general formula (2).

[Chem. 1]

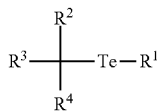

(1)

wherein $R^1$ represents an alkyl group having 1 to 8 carbon atoms, an aryl group or an aromatic heterocyclic group, $R^2$ and $R^3$ each represent a hydrogen atom or an alkyl group having 1 to 8 carbon atoms, and $R^4$ represents an alkyl group having 1 to 8 carbon atoms, an aryl group, an aromatic heterocyclic group, a acyl group, an amide group, an oxycarbonyl group or a cyano group.

$(R^1Te)_2$      (2)

wherein $R^1$ represents an alkyl group having 1 to 8 carbon atoms, an aryl group or an aromatic heterocyclic group.

Specific examples of such organotellurium compounds as represented by the general formula (1) include (methyltelluromethyl)benzene, (methyltelluromethyl)naphthalene, ethyl-2-methyl-2-methyltelluro-propionate, ethyl-2-methyl-2-n-butyltelluro-propionate, (2-trimethylsiloxyethyl)-2-methyl-2-methyltelluro-propionate, (2-hydroxyethyl)-2-methyl-2-methyltelluro-propionate, and (3-trimethylsilylpropargyl)-2-methyl-2-methyltelluro-propionate.

Specific examples of such compounds as represented by the general formula (2) include dimethyl ditelluride, diethyl ditelluride, di-n-propyl ditelluride, diisopropyl ditelluride, dicyclopropyl ditelluride, di-n-butyl ditelluride, di-s-butyl ditelluride, di-t-butyl ditelluride, dicyclobutyl ditelluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride.

Any azo polymerization initiator can be used without particular limitation insofar as it is usable in usual radical polymerization. Examples thereof include 2,2'-azobis-isobutyronitrile (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile) (V-70), 2,2'-azobis(2-methylamidinopropane) dihydrochloride, 2,2'-azobis[2-(2-imidazoline-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

The amount of use of the compound of the general formula (1) is appropriately adjusted according to the physical properties of a desired copolymer, but, generally, the compound of the general formula (1) is preferably used in an amount of 0.05 to 50 mmol with respect to 1 mol of the vinyl monomer.

In the case of using the compound of the general formula (1) and the azo polymerization initiator in combination, the azo polymerization initiator is preferably used in an amount of 0.01 to 10 mol with respect to 1 mol of the compound of the general formula (1).

In the case of using the compound of the general formula (1) and the compound of the general formula (2) in combination, the compound of the general formula (2) is preferably used in an amount of 0.01 to 100 mol with respect to 1 mol of the compound of the general formula (1).

In the case of using the compound of the general formula (1), the compound of the general formula (2), and the azo polymerization initiator in combination, the azo polymerization initiator is preferably used in an amount of 0.01 to 100 mol with respect to 1 mol of the total of the compound of the general formula (1) and the compound of the general formula (2).

Polymerization reaction can be conducted even in the absence of solvent, but is conducted, using an organic solvent or aqueous solvent commonly used for radical polymerization, by stirring the above mixture. Examples of organic solvents that can be used include benzene, toluene, N,N-dimethylformamide (DMF), dimethyl sulfoxide (DMSO), acetone, 2-butanone (methyl ethyl ketone), dioxane, hexafluoroisopropanol, chloroform, carbon tetrachloride, tetrahydrofuran (THF), ethyl acetate, and trifluoromethylbenzene. Examples of aqueous solvents include water, methanol, ethanol, isopropanol, n-butanol, ethyl cellosolve, butyl cellosolve, 1-methoxy-2-propanol, and diacetone alcohol.

The reaction temperature and the reaction time are appropriately adjusted depending on the molecular weight or molecular weight distribution of a copolymer to be obtained, but the mixture is generally stirred at 0 to 150° C. for 1 minute to 100 hours. The TERP process can provide a high yield and an accurate molecular weight distribution even at a low polymerization temperature and even for a short polymerization time.

After the end of the polymerization reaction, a desired copolymer can be separated from the resultant reaction mixture by usual separation and refinement means.

<Pigment Dispersion Composition>

A pigment dispersion composition according to this embodiment contains: a dispersant containing the above block copolymer; a pigment; and a dispersion medium.

Hereinafter, a description will be given of various components of the pigment dispersion composition.

Any organic pigment or any inorganic pigment can be used without particular limitation as the pigment for use in the present invention and examples include various colored pigments, such as a red pigment, a yellow pigment, an orange pigment, a blue pigment, a green pigment, a violet pigment, a black pigment, and a white pigment.

Examples of organic pigments include: azo pigments, including monoazo, diazo, and condensed diazo pigments; and polycyclic pigments, including diketopyrrolopyrrole, phthalocyanine, isoindolinone, isoindoline, quinacridone, indigo, thioindigo, quinophthalone, dioxazine, anthraquinone, perylene, and perinone pigments.

Examples of inorganic pigments include carbon black pigments, such as furnace black, lamp black, acetylene black, and channel black, and titanium dioxide.

The pigment contained in the pigment dispersion composition is preferably used with the selection of the type of pigment, the particle diameter, and the type of treatment according to the purpose. Furthermore, the number of types of pigments contained in the pigment dispersion composition may be singular or plural.

Specific examples of pigments include: red pigments, such as CI Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255, and 264; yellow pigments, such as CI Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194, and 213; orange pigments, such as CI Pigment Orange 36, 38, and 43; blue pigments, such as CI Pigment Blue 15, 15:2, 15:3, 15:4, 15:6, 16, 22, and 60; green pigments, such as CI Pigment Green 7, 36, and 58; violet pigments, such as CI Pigment Violet 19, 23, 32, and 50; and black pigments, such as CI Pigment Black 7.

Among the above pigments, pigments biased toward the basic side on the surfaces are preferably used.

For example, heretofore known organic solvents can be used as the dispersion medium for use in the present invention and they may be used alone or in combination of two or more thereof. Examples of such organic solvents include: hydrocarbon solvents, such as hexane and toluene; alcohol solvents, such as butanone; ester solvents, such as propyl acetate and butyl acetate; ketone solvents, such as cyclohexane and methylisobutyl ketone; glycol solvents, such as diethylene glycol monobutyl ether, and propylene glycol monomethyl ether; glycol ester or ether solvents, such as propylene glycol monomethyl ether acetate and dipropylene glycol dibutyl ether; amide solvents, such as N-methyl pyrrolidone and dimethylacetamide; and carbonate solvents, such as ethylene carbonate and propylene carbonate.

The pigment dispersion composition according to the present invention may contain, as necessary, a pigment derivative and/or other additives.

Because it can be assumed that acid groups in the dispersant according to the present invention adsorb to the pigment surface by hydrogen bonding, ionic bonding or the like, the preferred pigment derivative to be used is a pigment derivative in which an amino group, which is basic, is introduced.

The pigment derivative used in the present invention refers to a compound having the same molecular structure as the pigment used in the pigment dispersion composition according to the present invention, a compound similar to the above molecular structure, the structure of a raw material used in the pigment, and its similar structure and is not particularly limited. Examples include azo pigment skeletons, phthalocyanine pigment skeletons, anthraquinone pigment skeletons, triazine pigment skeletons, acridine pigment skeletons, and perylene pigment skeletons. Examples of amino groups which are basic include heretofore known primary, secondary, tertiary, and quaternary amino groups and quaternary ammonium salts and also include a sulfonamide group. The amino group may be bonded directly to a pigment skeleton or may be bonded through a hydrocarbon group, such as an alkyl group or an aryl group, to the pigment skeleton or through a hydrocarbon group thereto by ester bonding, ether bonding, sulfone bonding or urethane bonding.

Examples of other additives include an ultraviolet ray absorber, a leveling agent, a defoamer, and a photopolymerization initiator. For example, a photosensitive resin varnish or a non-photosensitive resin varnish is used as a resin.

Specific examples of photosensitive resin varnishes include: varnishes of photosensitive cyclized rubber resins, photosensitive phenolic resins, photosensitive polyacrylate resins, photosensitive polyamide resins, photosensitive polyimide resins, unsaturated polyester resins, polyester acrylate resins, polyepoxy acrylate resins, polyurethane acrylate resins, polyether acrylate resins, and polyol acrylate resins; and varnishes further containing a monomer added as a reactive diluent. Suitable among the above photosensitive resin varnishes are acrylate resins containing a free carboxyl group in the molecule and thus capable of being alkaline-developed.

Specific examples of non-photosensitive resin varnishes include cellulose acetate resins, nitrocellulose resins, styrene (co)polymers, polyvinyl butyral resins, amino-alkyd resins, polyester resins, amino resin-modified polyester resins, polyurethane resins, acrylic polyol urethane resins, soluble polyamide resins, soluble polyimide resins, soluble polyamide-imide resins, soluble polyester-imide resins, hydroxyethyl cellulose, water-soluble salts of styrene-maleic acid ester copolymers, water-soluble salts of (meth) acrylic acid ester (co)polymers, water-soluble amino-alkyd resins, water-soluble amino-polyester resins, and water-soluble polyamide resins, and these resin varnishes are used alone or in combination of two or more thereof.

As described above, the pigment dispersion composition according to the present invention contains at least a dispersant containing the block copolymer according to the present invention, a pigment, and a dispersion medium and the pigment is dispersed therein, as necessary, with a pigment derivative and/or other additives added thereto. No particular limitation is placed on the compounding amount of the dispersant, but it is preferably 5 to 200 parts by mass, more preferably 10 to 100 parts by mass, and still more preferably 10 to 50 parts by mass relative to 100 parts by mass of the pigment. If the compounding amount of dispersant is too small, the pigment cannot sufficiently be dispersed. If the compounding amount of dispersant is too large, the pigment dispersant not adsorbing to the pigment is present in the dispersion medium, which is undesirable. No particular limitation is placed on the pigment concentration insofar as it is a concentration giving a sufficient color density to a recorded body, but it is preferably 0.5 to 70% by mass and more preferably 5 to 50% by mass. If the pigment concentration is above 70% by mass, the pigment density in the dispersion medium becomes high, which may cause a problem of agglomeration of pigment particles due to inhibition of their free migration.

No particular limitation is placed on the method for dispersing the pigment and any heretofore known method can be applied. For example, dispersion can be achieved by mixing the dispersant according to the present invention, the pigment, and the dispersion medium using a mixer-disperser, such as a paint shaker, a bead mill, a ball mill, dissolver or a kneader.

The use of the block copolymer according to the present invention as the dispersant can give excellent dispersion stability to the pigment in the dispersion medium, for which reason the pigment dispersion composition according to the present invention can be used for heretofore known colorants. Specific examples of such colorants include ink-jet ink, color filter ink, gravure ink, paint, stationery ink, pen ink, and coating agent.

EXAMPLES

The present invention will be described below in further detail with reference to specific examples. The present invention is not at all limited by the following examples and modifications and variations may be appropriately made therein without changing the gist of the invention. Measurements for various properties in Examples and Comparative Examples were made according to the following methods.

(Rate of Polymerization)

Each example was measured in team of $^1$H-NMR by NMR (at 500 MHz) and its rate of polymerization was calculated from the peak area ratio between the vinyl group of the monomer and the ester side chain of the polymer.

(Weight-Average Molecular Weight (Mw) and Molecular Weight Distribution (PDI))

GPC was performed using TSKgel SuperMultipore HZ-H (φ4.6×150, TOSOH Co., Tokyo, Japan)×2 (manufactured by Tosoh Corporation) as columns, tetrahydrofuran as a mobile phase, and polystyrene (Tosoh TSK Standard) as a standard to make a calibration curve and measure the weight-average molecular weight (Mw) and the number average molecular weight (Mn). The molecular weight distribution (PDI) was calculated from these measured values.

(Acid Value)

The acid value represents the weight of potassium hydroxide taken to neutralize an acid component per gram of solid content. A measurement sample was dissolved in tetrahydrofuran and the resultant solution was neutralized and titrated with a 0.5 M potassium hydroxide/ethanol solution using a potentiometric titrator (trade name: GT-06, manufactured by Mitsubishi Chemical Corporation). The acid value was calculated from the following equation with the inflection point of the pH titration curve as a titration end point.

$A = 56.11 \times Vs \times 0.5 \times f/w$

A: acid value (mgKOH/g),

Vs: amount of use of 0.5 M potassium hydroxide/ethanol solution taken for titration (mL), f: titer of 0.5 M potassium hydroxide/ethanol solution, and w: weight of measurement sample (g) (in solid content equivalent).

(Viscosity)

The viscosity was measured at 25° C. and a number of rotor revolutions of 60 rpm using a model E viscometer (trade name: TVE-22L, manufactured by Toki Sangyo Co., Ltd.) and a conical rotor of 1° 34'×R24 and evaluation was made based on the following criteria.

double circle: 20 mPa·s or less
circle: over 20 mPa·s and below 40 mPa·s
cross: 40 mPa·s or more (Stability)

As for the viscosity stability, the rate of change of viscosity before and after storage at 40° C. for a week was determined and the rate of change of viscosity from the initial viscosity was evaluated based on the following criteria.

double circle: ±5% or less
circle: over ±5% and below ±10%
cross: ±10% or more

Production of Copolymer

Example 1

An amount of 20.0 g of methyl methacrylate (hereinafter, referred to as "MMA"), 40.0 g of n-butyl methacrylate (hereinafter, referred to as "BMA"), 0.328 g of azobisisobutyronitrile (trade name: AIBN, manufactured by Otsuka Chemical Co., Ltd., hereinafter referred to as "AIBN"), and 60.0 g of propylene glycol monomethyl ether (hereinafter, referred to as "MP") were charged into a reaction vessel equipped with an argon gas introduction pipe, a stirrer, and a thermometer, the atmosphere in the vessel was substituted with argon, and 3.00 g of ethyl-2-methyl-2-n-butyltelluropropionate (hereinafter, referred to as "BTEE") and 1.116 g of dibutyl ditelluride (hereinafter, referred to as "DBDT") were then added into the vessel, followed by allowing the mixture to undergo reaction at 60° C. for 20 hours. The rate of polymerization was 100%.

Added to the resultant solution was a mixed solution of 20.0 g of BMA, 20.0 g of methacrylic acid (hereinafter, referred to as "MAA"), 0.328 g of AIBN, and 40.0 g of MP, previously placed in an argon-substituted atmosphere, followed by allowing the resultant mixture to undergo reaction at 60° C. for 20 hours. The rate of polymerization was 100%.

Added to the resultant solution was a mixed solution of 20.0 g of MMA, 40.0 g of BMA, 0.328 g of AIBN, and 60.0 g of MP, previously placed in an argon-substituted atmosphere, followed by allowing the resultant mixture to undergo reaction at 60° C. for 20 hours. The rate of polymerization was 98%.

After the end of the reaction, 80.0 g of MP was added to the reaction solution and the mixture was introduced into 800 mL of n-heptane being stirred. The resultant polymer precipitate was filtered by suction and dried to give a copolymer. The resultant copolymer was measured in terms of Mw, PDI, and acid value. The results are shown in Table 1.

Example 2

An amount of 15.83 g of methyl acrylate (hereinafter, referred to as "MA"), 31.67 g of BA, 0.328 g of AIBN, and 47.50 g of MP were charged into a reaction vessel equipped with an argon gas introduction pipe, a stirrer, and a thermometer, the atmosphere in the vessel was substituted with argon, and 3.00 g of BTEE and 1.116 g of DBDT were then added into the vessel, followed by allowing the mixture to undergo reaction at 60° C. for 20 hours. The rate of polymerization was 98%.

Added to the resultant solution was a mixed solution of 5.02 g of butyl acrylate (hereinafter referred to as "BA"), 20.04 g of acrylic acid (hereinafter, referred to as "AA"), 0.328 g of AIBN, and 25.06 g of MP, previously placed in an argon-substituted atmosphere, followed by allowing the resultant mixture to undergo reaction at 60° C. for 20 hours. The rate of polymerization was 100%.

Added to the resultant solution was a mixed solution of 15.83 g of MA, 31.67 g of BA, 0.328 g of AIBN, and 47.50 g of MP, previously placed in an argon-substituted atmosphere, followed by allowing the resultant mixture to undergo reaction at 60° C. for 20 hours. The rate of polymerization was 99%.

After the end of the reaction, 60.00 g of MP was added to the reaction solution and the mixture was introduced into 600 mL of n-heptane being stirred. The resultant polymer precipitate was filtered by suction and dried to give a copolymer. The resultant copolymer was measured in terms of Mw, PDI, and acid value. The results are shown in Table 1.

Comparative Example 1

An amount of 60.0 g of MMA, 0.656 g of AIBN, and 60.0 g of MP were charged into a reaction vessel equipped with an argon gas introduction pipe, a stirrer, and a thermometer, the atmosphere in the vessel was substituted with argon, and 3.00 g of BTEE and 1.116 g of DBDT were then added into the vessel, followed by allowing the mixture to undergo reaction at 60° C. for 20 hours. The rate of polymerization was 99%.

Added to the resultant solution was a mixed solution of 20.0 g of BMA, 20.0 g of MAA, 0.328 g of AIBN, and 40.0 g of MP, previously placed in an argon-substituted atmosphere, followed by allowing the resultant mixture to undergo reaction at 60° C. for 20 hours. The rate of polymerization was 100%.

After the end of the reaction, 50.0 g of MP was added to the reaction solution and the mixture was introduced into 500 mL of n-heptane being stirred. The resultant polymer precipitate was filtered by suction and dried to give a copolymer. The resultant copolymer was measured in terms of Mw, PDI, and acid value. The results are shown in Table 1.

Comparative Example 2

An amount of 30.0 g of MMA, 0.328 g of AIBN, and 30.0 g of MP were charged into a reaction vessel equipped with an argon gas introduction pipe, a stirrer, and a thermometer, the atmosphere in the vessel was substituted with argon, and 3.00 g of BTEE and 1.116 g of DBDT were then added into the vessel, followed by allowing the mixture to undergo reaction at 60° C. for 20 hours. The rate of polymerization was 98%.

Added to the resultant solution was a mixed solution of 14.0 g of 2 mol caprolactone adduct of 2-hydroxyethyl methacrylate (hereinafter, referred to as "PCL2"), 10.0 g of 2-hydroxyethyl methacrylate (hereinafter, referred to as "HEMA"), 12.0 g of MAA, 0.328 g of AIBN, and 36.0 g of MP, previously placed in an argon-substituted atmosphere, followed by allowing the resultant mixture to undergo reaction at 60° C. for 20 hours. The rate of polymerization was 97%.

Added to the resultant solution was a mixed solution of 17.0 g of MAA, 17.0 g of BMA, 0.328 g of AIBN, and 34.0 g of MP, previously placed in an argon-substituted atmosphere, followed by allowing the resultant mixture to undergo reaction at 60° C. for 20 hours. The rate of polymerization was 100%.

After the end of the reaction, 50.0 g of MP was added to the reaction solution and the mixture was introduced into 500 mL of n-heptane being stirred. The resultant polymer precipitate was filtered by suction and dried to give a copolymer. The resultant copolymer was measured in terms of Mw, PDI, and acid value. The results are shown in Table 1.

Comparative Example 3

An amount of 23.29 g of MA, 0.328 g of AIBN, and 23.29 g of MP were charged into a reaction vessel equipped with an argon gas introduction pipe, a stirrer, and a thermometer, the atmosphere in the vessel was substituted with argon, and 3.00 g of BTEE and 1.116 g of DBDT were then added into the vessel, followed by allowing the mixture to undergo reaction at 60° C. for 20 hours. The rate of polymerization was 99%.

Added to the resultant solution was a mixed solution of 47.84 g of BA, 0.328 g of AIBN, and 47.84 g of MP, previously placed in an argon-substituted atmosphere, followed by allowing the resultant mixture to undergo reaction at 60° C. for 20 hours. The rate of polymerization was 98%.

Added to the resultant solution was a mixed solution of 14.12 g of BA, 50.63 g of 2-acroyloxyethylsuccinic acid (hereinafter, referred to as "AOES"), 0.328 g of AIBN, and 64.75 g of MP, previously placed in an argon-substituted atmosphere, followed by allowing the resultant mixture to undergo reaction at 60° C. for 20 hours. The rate of polymerization was 98%.

After the end of the reaction, 50.00 g of MP was added to the reaction solution and the mixture was introduced into 500 mL of n-heptane being stirred. The resultant polymer precipitate was filtered by suction and dried to give a copolymer. The resultant copolymer was measured in terms of Mw, PDI, and acid value. The results are shown in Table 1.

Comparative Example 4

An amount of 22.0 g of MMA, 0.328 g of AIBN, and 22.0 g of MP were charged into a reaction vessel equipped with an argon gas introduction pipe, a stirrer, and a thermometer, the atmosphere in the vessel was substituted with argon, and 3.00 g of BTEE and 1.116 g of DBDT were then added into the vessel, followed by allowing the mixture to undergo reaction at 60° C. for 20 hours. The rate of polymerization was 98%.

Added to the resultant solution was a mixed solution of 44.0 g of BMA, 0.328 g of AIBN, and 44.0 g of MP, previously placed in an argon-substituted atmosphere, followed by allowing the resultant mixture to undergo reaction at 60° C. for 20 hours. The rate of polymerization was 99%.

Added to the resultant solution was a mixed solution of 45.12 g of 2-methacroyloxyethylsuccinic acid (hereinafter, referred to as "MOES"), 17.0 g of BMA, 0.328 g of AIBN, and 62.12 g of MP, previously placed in an argon-substituted atmosphere, followed by allowing the resultant mixture to undergo reaction at 60° C. for 20 hours. The rate of polymerization was 98%.

After the end of the reaction, 64.0 g of MP was added to the reaction solution and the mixture was introduced into 640 mL of n-heptane being stirred. The resultant polymer precipitate was filtered by suction and dried to give a copolymer. The resultant copolymer was measured in terms of Mw, PDI, and acid value. The results are shown in Table 1.

Production of Pigment Dispersion Composition

Example 3

A pigment dispersion composition was obtained by adjusting the compounding to give 50% by mass pigment (titanium dioxide), 5% by mass dispersant (copolymer obtained in Example 1), and 45% by mass propylene glycol monomethyl ether acetate (hereinafter, referred to as "PMA") and mixing them for 30 minutes using a ultrasonic homogenizer to disperse the pigment.

The obtained pigment dispersion composition was evaluated in terms of viscosity and stability. The results are shown in Table 2.

(Example 4) Application to Color Filter Ink

A pigment dispersion composition was obtained by adjusting the compounding to give 10% by mass pigment (CI Pigment Red 254, trade name: BKCF, manufactured by Ciba Specialty Chemicals, Inc.), 3% by mass dispersant (copolymer obtained in Example 1), 3% by mass binder resin (PMA solution of a product obtained by polymerizing benzyl methacrylate and methacrylic acid at a mass ratio of 80 to 20, Mw=9800, PDI=1.93, acid value: 127 mgKOH/g, solid content: 40% by mass), and 84% by mass PMA and mixing them for 30 minutes using a ultrasonic homogenizer to disperse the pigment.

The obtained pigment dispersion composition was evaluated in terms of viscosity and stability. The results are shown in Table 2.

Example 5

A pigment dispersion composition was obtained in the same manner as in Example 4 except that the copolymer was changed to the copolymer obtained in Example 2.

Comparative Example 5

A pigment dispersion composition was obtained in the same manner as in Example 4 except that the copolymer was changed to the copolymer obtained in Comparative Example 1.

Comparative Example 6

A pigment dispersion composition was obtained in the same manner as in Example 4 except that the copolymer was changed to the copolymer obtained in Comparative Example 2.

Comparative Example 7

A pigment dispersion composition was obtained in the same manner as in Example 4 except that the copolymer was changed to the copolymer obtained in Comparative Example 3.

Comparative Example 8

A pigment dispersion composition was obtained in the same manner as in Example 4 except that the copolymer was changed to the copolymer obtained in Comparative Example 4.

TABLE 1

| | Composition | | | Mw | PDI | Acid Value [mg/KOH] |
|---|---|---|---|---|---|---|
| | A Block | B Block | A Block | | | |
| Ex. 1 | MMA/BMA | MAA/BMA | MMA/BMA | 20600 | 1.26 | 90 |
| Ex. 2 | MA/BA | AA/BA | MA/BA | 13800 | 1.27 | 139 |
| Comp. Ex. 1 | MMA | MAA/BMA | | 13700 | 1.55 | 127 |
| Comp. Ex. 2 | MMA | MMA/HEMA/PCL2 | MAA/BMA | 16000 | 1.30 | 112 |
| Comp. Ex. 3 | MA | BA | AOES/BA | 28500 | 1.36 | 90 |
| Comp. Ex. 4 | MMA | BMA | MOES/BMA | 20700 | 1.35 | 90 |

TABLE 2

| | | | Evaluation of Pigment Dispersion Composition | |
|---|---|---|---|---|
| | Pigment | Dispersant | Viscosity | Stability |
| Ex. 3 | titanium oxide | Ex. 1 | ○ | ○ |
| Ex. 4 | Pigment Red 254 | Ex. 1 | ○ | ○ |
| Ex. 5 | Pigment Red 254 | Ex. 2 | ◎ | ◎ |
| Comp. Ex. 5 | Pigment Red 254 | Comp. Ex. 1 | X | X |
| Comp. Ex. 6 | Pigment Red 254 | Comp. Ex. 2 | X | X |
| Comp. Ex. 7 | Pigment Red 254 | Comp. Ex. 3 | ○ | X |
| Comp. Ex. 8 | Pigment Red 254 | Comp. Ex. 4 | ○ | X |

As shown in Table 2, it can be seen that the pigment dispersion compositions of Examples 3 to 5 in which the block copolymer of Example 1 or 2 according to the present invention was used as the dispersant had low viscosity and excellent viscosity stability and, therefore, had excellent pigment dispersion stability.

The invention claimed is:

1. A block copolymer of an ABA type including an A block and a B block and having an acid value of 30 to 250 mgKOH/g, the B block containing a structural unit derived from a vinyl monomer with an acid group, wherein a structural unit derived from a vinyl monomer with an acid group and contained in the A block is at a content of 10% by mass or less in 100% by mass of the A block.

2. The block copolymer according to claim 1, wherein the structural unit derived from a vinyl monomer with an acid group and contained in the B block is at a content of 40% by mass or more in 100% by mass of the B block.

3. The block copolymer according to claim 1, wherein the acid group is at least one selected from among a carboxyl group, a sulfonic acid group, and a phosphoric acid group.

4. The block copolymer according to claim 1, wherein a content of the B block is 5 to 95% by mass in 100% by mass of the entire block copolymer.

5. The block copolymer according to claim 1, being formed by living radical polymerization.

6. A dispersant containing the block copolymer according to claim 1.

7. A pigment dispersion composition containing the dispersant according to claim 6, a pigment, and a dispersion medium.

* * * * *